United States Patent
Duncan et al.

(10) Patent No.: US 6,566,458 B2
(45) Date of Patent: May 20, 2003

(54) POLYSULFONE/POLYSILOXANE POLYCARBONATE BLOCK COPOLYMERS

(75) Inventors: Miles A. Duncan, Mt. Vernon, IN (US); Lioba M. Kloppenburg, Cohoes, NY (US); Parfait Jean Marie Likibi, Newburgh, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/737,153

(22) Filed: Dec. 14, 2000

(65) Prior Publication Data

US 2002/0115791 A1 Aug. 22, 2002

(51) Int. Cl.$^7$ .................................. C08L 83/10
(52) U.S. Cl. .................. 525/474; 556/436; 528/29; 528/25; 528/196; 528/204; 528/391; 568/28; 568/723
(58) Field of Search .................. 556/436; 528/29, 528/25, 196, 204, 391; 568/28, 273; 525/474

(56) References Cited

U.S. PATENT DOCUMENTS

| | | | |
|---|---|---|---|
| 3,154,008 A | | 10/1964 | Hurter |
| 3,419,634 A | * | 12/1968 | Vaughn |
| 3,419,635 A | | 12/1968 | Vaughn |
| 4,217,438 A | | 8/1980 | Brunelle et al. |
| 4,358,569 A | | 11/1982 | Quinn et al. |
| 4,870,125 A | | 9/1989 | Nelson |
| 6,013,716 A | | 1/2000 | Nomura et al. |
| 6,072,011 A | | 6/2000 | Hoover |

OTHER PUBLICATIONS

Allen Noshay and James E. McGrath, "Block Copolymers, Overview and Critical Survey" *Academic Press* pp. 402–409 and 452–453 New York (1977).
JP 5140310 Abstract Only. Publication Date of Jun. 8, 1993. 1 page.
JP 54033534 Abstract Only. Publication Date of Mar. 12, 1979. 1 page.
JP 8302178 Abstract Only. Publication Date of Nov. 19, 1996. 1 page.
JP 1776678 Abstract Only. Publication Date of Nov. 23, 1992. 1 page.

* cited by examiner

*Primary Examiner*—Robert Dawson
*Assistant Examiner*—Kuo-Liang Peng

(57) ABSTRACT

A block copolymer comprises structural units of the formula (I):

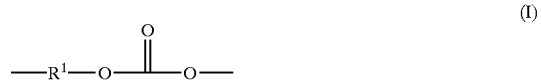

wherein $R^1$ comprises polysulfone groups and structural units of the formula (II):

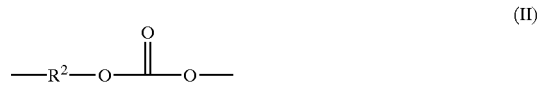

wherein $R^2$ comprises polysiloxane groups.

32 Claims, No Drawings

POLYSULFONE/POLYSILOXANE POLYCARBONATE BLOCK COPOLYMERS

BACKGROUND OF THE INVENTION

This invention relates to polycarbonate block copolymers and especially to flame retardant polycarbonate block copolymers.

Polycarbonate resins are useful in high temperature applications because they exhibit excellent high heat performance. It is therefore important for these resins and/or resin compositions to be flame resistant. Previously, flame resistance has been achieved with the addition of flame retardants, generally halogenated flame retardants or halogenated blocks within the polycarbonate polymer chain. The addition of flame retardants increases the cost of the materials, and plastics employing halogenated materials may release toxic gas when heated to elevated temperatures. As a result, non-halogenated fire resistant materials, especially those that are transparent, are in demand for a wide range of applications.

Copolymers having organopolysiloxane blocks and polycarbonate blocks are known. U.S. Pat. No. 3,419,635 to Vaughn, incorporated by reference herein, discloses room temperature vulcanizing organopolysiloxane-polycarbonate block copolymers and methods of making them. The organopolysiloxane-polycarbonate block copolymers are useful in elastomeric applications. U.S. Pat. No. 6,072,011 to Hoover also discloses block copolymers useful as molding resins comprising polycarbonate blocks and polysiloxane blocks. In contrast to the compositions disclosed in Vaughn, the compositions as taught by Hoover are thermoplastic. Neither composition is disclosed to be transparent, and the compositions of Hoover as taught in the examples employ a halogenated fire retardant.

Accordingly, there is a need in the art for non-halogenated, highly fire resistant polycarbonate resins, especially polycarbonate resins that are transparent and exhibit excellent high heat performance.

BRIEF SUMMARY OF THE INVENTION

The above described drawbacks and deficiencies are overcome or alleviated by a block copolymer comprising structural units of the formula (I):

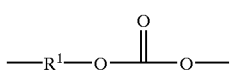

(I)

wherein $R^1$ comprises polysulfone groups, and structural units of the formula (II):

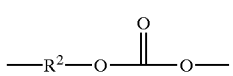

(II)

wherein $R^2$ comprises polysiloxane groups.

DETAILED DESCRIPTION OF THE INVENTION

A block copolymer comprises structural units of the formula (I):

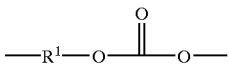

(I)

in which $R^1$ comprises polysulfone groups, and structural units of the formula (II):

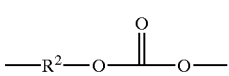

(II)

wherein $R^2$ comprises polysiloxane groups. The block copolymer may further comprise structural units of the formula (III):

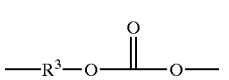

(III)

wherein $R^3$ comprises aromatic and/or aliphatic groups. The structural units of formula (I) are hereinafter referred to as the polysulfone structural units. The structural units of formula (II) are hereinafter referred to as the polysiloxane structural units. The structural units of formula (III) are hereinafter referred to as the aromatic/aliphatic structural units. The polysulfone structural units and polysiloxane structural units and, when present, the aromatic/aliphatic structural units may be arranged in a random sequence or in a non-random repeating sequence. Typically the polysulfone structural units comprise about 80 weight percent to about 99.9 weight percent of the block copolymer. The polysiloxane structural units typically comprise about 0.1 weight percent to about 20 weight percent of the block copolymer. When it is desired for the block copolymer to be transparent, the polysiloxane structural unit content is preferably less than about 4.6 weight percent of the block copolymer. The aromatic/aliphatic structural units, when present, comprise about 0.1 weight percent to about 98 weight percent of the block copolymer. The block copolymer may have an average molecular weight, Mw, in the range of about 10,000 to about 100,000, with a range of about 25,000 to about 35,000 preferred.

The block copolymer is preferably made by the reaction of a carbonate precursor, such as phosgene, dihydroxy polysulfone oligomer(s) and dihydroxy polysiloxane oligomer(s). When the block copolymer comprises aromatic or aliphatic, structural units as well as polysulfone structural units and polysiloxane structural units it is preferably made by the reaction of a carbonate precursor, such as phosgene, dihydroxy polysulfone oligomer(s), dihydroxy polysiloxane oligomers and dihydroxy aromatic and/or dihydroxy aliphatic compound(s). It is also possible that the block copolymer may be made by other methods known in the art for making polycarbonates such as transesterification as disclosed in U.S. Pat. No. 3,154,008.

Useful dihydroxy polysulfone oligomers include dihydroxy aromatic polysulfone oligomers. An aromatic polysulfone oligomer is defined as a polyarylene compound in which an arylene unit, an ether unit, and a sulfone bond are essential constitutional units and in which the arylene units are disorderly or orderly arranged together with the ether and sulfone bonds. Suitable arylene units include substituted and unsubstituted phenylene, napthylene, and other multi-cyclic aromatic compounds as well as divalent aromatic moieties of the formula:

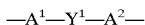

wherein $A^1$, $Y^1$, and $A^2$ are described below.

It is preferred that the hydroxyl functionalities be located terminally although it is within the scope of the invention for one or both hydroxyl functionalities to have a non-terminal location. Non-terminal is herein defined as being located in a position other than at the end of the oligomer chain. Useful molecular weights of dihydroxyl aromatic polysulfone oligomers are about 500 to about 10,000. Dihydroxyl aromatic polysulfone oligomers with a molecular weight of about 2,000 to about 3,500 are preferred.

A preferred aromatic polysulfone oligomer comprises repeating units characterized by the general formula:

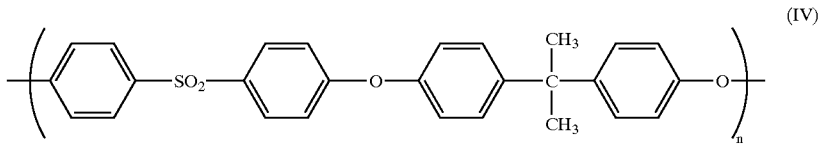

wherein useful values for n are in the range from 1 to about 10.

An especially preferred hydroxyl terminated aromatic polysulfone oligomer has the formula

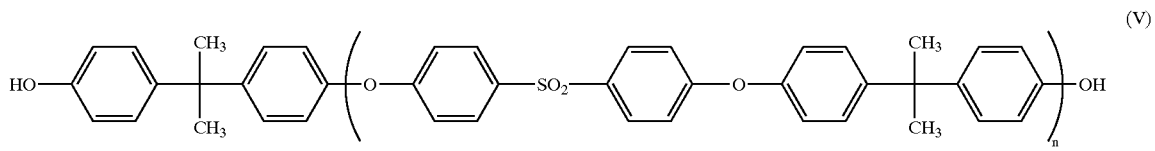

wherein n is equal to approximately 5. The especially preferred hydroxyl terminated aromatic polysulfone oligomer is well known and can be made by the reaction of dichlorodiphenylsulfone and bisphenol A wherein bisphenol A is present in slight excess.

Useful dihydroxy polysiloxane oligomers include, but are not limited to hydroxyl terminated poly(dialkylsiloxane) oligomers comprising repeating units of the general formula:

wherein $R^4$ and $R^5$ are selected independently from saturated and unsaturated hydrocarbons having 1 to about 15 carbons, including alkyl groups, alkylene groups, and aryl groups. Preferably, $R^4$ and $R^5$ are methyl or phenyl. The number of repeating units can range from 0 to about 120. Preferred dihydroxy polysiloxane oligomers are terminated by a substituted or unsubstituted hydroxy aromatic group, wherein the substituents may be halo, aryl, alkyl, alkylene, alkoxy or aryloxy groups having from 1 to about 15 carbons. Especially preferred dihydroxy polysiloxane oligomers are phenol or eugenol terminated. A preferred eugenol terminated polysiloxane oligomer has the formula:

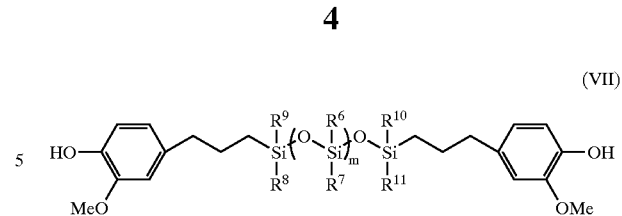

with m=0–47 and $R^{6-11}$ selected independently from saturated and unsaturated hydrocarbons having 1 to about 15 carbons, including alkyl groups, alkylene groups, and aryl groups. Preferably, $R^{6-11}$ are methyl or phenyl.

Useful dihydroxy aromatic or aliphatic compounds comprise from 2 to about 50 carbons. Preferably the dihydroxy compound is an aromatic dihydroxy compound with the formula

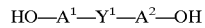

wherein each of $A^1$ and $A^2$ is a monocyclic aryl group and $Y^1$ is a bridging group having one or two atoms which separate $A^1$ from $A^2$. In an exemplary embodiment, one atom separates $A^1$ from $A^2$. Illustrative non-limiting examples of groups of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group or a saturated hydrocarbon group such as methylene, cyclohexylidene or isopropylidene.

Especially preferred are bisphenol compounds having general formula (VIII) as follows:

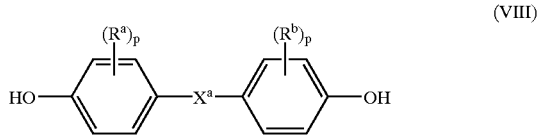

wherein $R^a$ and $R^b$ each represent a halogen atom or a monovalent hydrocarbon group and may be the same or different; p and q are each independently integers from 0 to 4; and $X^a$ represents one of the groups of formula (VII):

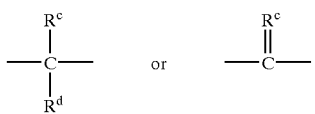

(IX)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted aromatic hydrocarbons disclosed by name or formula (generic or specific) in U.S. Pat. No. 4,217,438, which is incorporated herein by reference. A nonexclusive list of specific examples of the types of bisphenol compounds that may be represented by formula (VI) includes the following:

1,1-bis(4-hydroxyphenyl)methane;
1,1-bis(4-hydroxyphenyl)ethane;
2,2-bis(4-hydroxyphenyl)propane (hereinafter "bisphenol A" or "BPA");
2,2-bis(4-hydroxyphenyl)butane;
2,2-bis(4-hydroxyphenyl)octane;
1,1-bis(4-hydroxyphenyl)propane;
1,1-bis(4-hydroxyphenyl)n-butane;
bis(4-hydroxyphenyl)phenylmethane;
2,2-bis(4-hydroxy-1-methylphenyl)propane;
1,1-bis(4-hydroxy-t-butylphenyl)propane;
bis(hydroxyaryl)alkanes such as 2,2-bis(4-hydroxy-3-bromophenyl)propane;
1,1-bis(4-hydroxyphenyl)cyclopentane; and
bis(hydroxyaryl)cycloalkanes such as 1,1-bis(4-hydroxyphenyl)cyclohexane.

It is preferable to include, during synthesis of the block copolymer, an endcapping or terminating agent. The use of endcapping agents is well known in the art and all known endcapping agents are useful, especially aromatic compounds with a single hydroxyl group such as phenol, alkyl substituted phenol and napthol. Useful amounts of endcapping agents are about 0.1 to about 2.0 weight percent.

The block copolymers of the invention may be employed without further admixture, or after admixture with various additives. Such additives are known to the art of plastics compounding, and may include, for example, about 0.5 to about 20 parts by weight of a filler or a reinforcing agent; about 0.01 to about 0.1 part by weight of a heat stabilizer; about 0.01 to about 0.2 part by weight of an antioxidant; about 0.1 to about 0.7 part by weight of a light stabilizer; about 0.5 to about 3 parts by weight of a plasticizer; about 0.1 to about 3 parts by weight of an antistatic agent; and about 0.1 to about 1 part by weight of a mold releasing agent. The above amounts of the additives are based on 100 parts by weight of the polycarbonate resin.

Examples of the filler or reinforcing agent include glass fibers, asbestos, carbon fibers, silica, talc and barium sulfate.

Examples of the heat stabilizer include triphenyl phosphite, tris-(2,6-dimethylphenyl)phosphite, tris-(mixed mono- and di-nonylphenyl)phosphite, dimethylbenzene phosphonate and trimethyl phosphate.

Examples of antioxidant include octadecyl-3-(3,5-di-tert-butyl-4-hydroxyphenyl)propionate, and pentaerythrityl-tetrakis[3-(3,5-di-tert-butyl-4-hydroxyphenyl)propionate].

Examples of the light stabilizer include 2-(2-hydroxy-5-methylphenyl)benzotriazole, 2-(2-hydroxy-5-tert-octylphenyl)-benzotriazole and 2-hydroxy-4-n-octoxy benzophenone.

Examples of the plasticizer include dioctyl-4, 5-epoxy-hexahydrophthalate, tris-(octoxycarbonylethyl) isocyanurate, tristearin and epoxidized soybean oil.

Examples of the antistatic agent include glycerol monostearate, sodium stearyl sulfonate, and sodium dodecylbenzenesulfonate.

Examples of the mold releasing agent include stearyl stearate, beeswax, montan wax and paraffin wax.

Such additives may be mixed at a suitable time during the mixing of the components for forming the composition.

The block copolymer is typically synthesized by charging a polymerization vessel with dihydroxy polysulfone oligomer, dihydroxy polysiloxane oligomer, optional aromatic or aliphatic dihydroxy compound, organic solvent, water, a base, typically an organic base, with sufficient basicity to remove the proton from the hydroxyl functionalities, and an endcapping agent and stirring the resulting mixture vigorously. Phosgene is bubbled through the solution at a rate sufficient to enable the polymerization reaction to proceed, generally about 5 grams/minute to about 75 grams/minute. The rate of phosgene bubbling is dependent upon the reaction conditions and is readily determined by one of ordinary skill in the art. Aqueous sodium hydroxide is added, preferably continuously, in order to maintain the pH of the solution between about 8 and about 11. The reaction is complete when the product has reached the desired molecular weight. The molecular weight can be determined by gel permeation chromatography or any other means known in the art. When the reaction is complete, the organic layer is separated from the aqueous layer, washed with dilute hydrochloric acid followed by deionized water. The solvent is then removed and the resulting colorless materials can be handled by all method known in the art, including, precipitation, extrusion, and molding.

The invention is further illustrated by the following non-limiting Examples.

EXAMPLES

In the following examples dihydroxy polysulfone oligomers with different molecular weights were used. In Example 3 a dihydroxy polysulfone oligomer with an average molecular weight (Mw) of 4426 was used. In the remaining examples a dihydroxy polysulfone oligomer with an average Mw of 3698 was used. The dihydroxy polysulfone oligomers were synthesized by combining 68.5 g of bisphenol A, 71.8 g chlorophenylsulfone, 83 g potassium carbonate, 300 milliliters dimethylacetamide and 150 milliliters toluene. The resulting mixture was heated under reflux, the toluene removed, and the polysulfone oligomer isolated using a water-methanol solution acidified to pH of about 4. The resulting white powder was dried at 60° C. in a vacuum oven.

The dihydroxy polysiloxane oligomers used in the following examples were eugenol terminated polysiloxane with either 10 or 20 intervening di(alkyl)siloxane groups (EuD10, EuD20). They are available under the general name α-dimethyl-3-(4'-hydroxy-3'-methoxyphenyl)propyl-silyloxy, α-dimethyl-3-(4'-hydroxy-3'-methoxyphenyl) propylsilyl polydimethylsiloxane from GE Silicones. 4-Cumyl phenol (PCP) was used as the endcapping agent in Examples 1–19, 24 and 25. Phenylchloroformate was used as the endcapping agent in Examples 20–23. Triethylamine (TEA) was the organic base. Bisphenol A (BPA) is used in Examples 24 and 25. Methylene chloride was the organic solvent.

Differential scanning calorimetry (DSC) analysis was used to determine the glass transition temperature (Tg) and was performed in a nitrogen atmosphere with a heating rate of 20° C. per min using a Perkin Elmer DSC-7 Calorimeter. Molecular weight was determined by gel permeation chromatography.

Flame testing was done using a vertical testing, procedure. A bar (125 mm bar as used in Notched Izod testing) was mounted vertically and subjected to five, five second applications of a 127 mm flame. To achieve a rating of 5VB, no bar specimen may burn with flaming or glowing combustion for more that 60 seconds after the fifth flame application. In addition, no burning drips are allowed that ignite cotton placed beneath the samples. The total procedure is repeated with five bars.

The following examples were made on both a large scale (greater than 2 kg of dihydroxy polysulfone oligomer) and on a laboratory scale (about 100 g or less of dihydroxy polysulfone oligomer). The dihydroxy polysulfone, dihydroxy polysiloxane, triethylamine, 4-cumyl phenol (PCP), methylene chloride and water were combined and stirred vigorously. The phosgene was bubbled through while aqueous sodium hydroxide was added to maintain the pH at about 10. In a large scale reaction the phosgene was typically bubbled at a rate of 15 g/minute and in a small scale reaction the phosgene was typically bubbled at a rate of 1 g/minute. The total amount of phosgene used was a 25% stoichiometric excess based on the sum of the starting materials. When the example was made on a large scale, 4 grams of sodium glutamate was added to the reaction to chelate any iron. When the large scale reaction was complete the organic layer was separated, diluted with methylene chloride, washed with dilute hydrochloric acid, centrifuged and the product was isolated by steam jet precipitation. In the small scale reactions the organic layer was separated, washed with dilute hydrochloric acid, washed with deionized water, and isolated by precipitation into hot water. The resulting resin was colorless. The amounts of reactants and vents of the examples are shown in Table 1.

TABLE 1

| No. | Poly-sulfone (g) | EuD10 (g) | EuD20 (g) | TEA (g) | End Capping Agent (g) | Water (mL) | CH$_2$Cl$_2$ (mL) |
|---|---|---|---|---|---|---|---|
| 1 | 2819.5 | 135.5 | — | 6.46 | 18.8 | 5000 | 16,000 |
| 2 | 98.0 | 2.0 | — | 0.73 | 1.34 | 150 | 500 |
| 3 | 98.0 | 2.0 | — | 0.73 | 1.34 | 100 | 500 |
| 4 | 62.0 | 2.98 | — | 0.044 | 0.3 | 100 | 450 |
| 5 | 62.0 | 2.98 | — | 0.044 | 0.45 | 100 | 450 |
| 6 | 60.4 | 4.61 | — | 0.044 | 0.31 | 100 | 450 |
| 7 | 58.7 | 6.34 | — | 0.044 | 0.32 | 100 | 450 |
| 8* | 65.0 | — | — | 0.044 | 0.29 | 150 | 450 |
| 9 | 60.2 | — | 4.84 | 0.044 | 0.29 | 150 | 450 |
| 10 | 55.04 | — | 9.96 | 0.044 | 0.30 | 150 | 450 |
| 11 | 62.0 | 2.98 | — | 0.145 | 0.45 | 150 | 500 |
| 12 | 62.0 | 2.98 | — | 0.145 | 0.45 | 150 | 500 |
| 13 | 62.0 | 2.98 | — | 0.145 | 0.60 | 150 | 500 |
| 14 | 62.0 | 2.98 | — | 0.145 | 0.90 | 150 | 500 |
| 15 | 60.4 | 4.61 | — | 0.145 | 0.62 | 150 | 500 |
| 16 | 60.2 | — | 4.84 | 0.145 | 0.44 | 150 | 500 |
| 17 | 60.2 | — | 4.84 | 0.145 | 0.58 | 150 | 500 |
| 18 | 60.2 | — | 4.84 | 0.145 | 0.87 | 150 | 500 |
| 19 | 57.6 | — | 7.36 | 0.145 | 0.59 | 150 | 500 |
| 20 | 62.0 | 2.98 | — | 0.290 | 0.22 | 150 | 500 |
| 21 | 62.0 | 2.98 | — | 0.290 | 0.44 | 150 | 500 |
| 22 | 60.2 | — | 4.84 | 0.290 | 0.21 | 150 | 500 |
| 23 | 60.16 | — | 4.84 | 0.290 | 0.43 | 150 | 500 |
| 24 | 2.94 | — | 8.51 | 0.363 | 2.71 | 300 | 500 |
| 25 | 1.68 | — | 1.21 | 0.414 | 2.90 | 300 | 500 |

*comparative example and outside the scope of the invention

The molecular weights of the examples, chloride content, and glass transition temperature (Tg) are shown in Table 2.

TABLE 2

| No. | Mw | Cl$^-$ (ppm) | Tg (° C.) |
|---|---|---|---|
| 1 | 31,851 | — | 177.0 |
| 2 | 36,549 | 1.09 | 183.7 |
| 3 | 26,342 | 2.45 | 180.0 |
| 4 | 12,076 | — | 162.7 |
| 5 | 45,950 | 37.91 | 182.8 |
| 6 | 50,866 | — | 181.8 |
| 7 | 50,989 | 47.57 | 179.8 |
| 8* | 48,922 | — | 188.9 |
| 9 | 46,961 | — | 189.2 |
| 10 | 17,231 | — | 175.5 |
| 11 | 44,439 | 7.95 | 181.4 |
| 12 | 39,300 | 5.98 | 181.3 |
| 13 | 39,966 | 3.47 | 182.3 |
| 14 | 34,712 | — | 185.9 |
| 15 | 39,938 | 0.04 | 180.4 |
| 16 | 44,618 | 1.79 | 188.3 |
| 17 | 40,848 | 18.72 | 182.9 |
| 18 | 35,756 | 4.69 | 183.2 |
| 19 | 41,322 | 0.84 | 183.3 |
| 20 | 58,044 | 1.49 | 184.5 |
| 21 | 44,730 | — | 182.9 |
| 22 | 49,576 | 1.13 | 184.7 |
| 23 | 38,101 | 0.14 | 181.5 |
| 24 | 15,000 | — | 135.5 |
| 25 | 22,000 | — | 146.0 |

*comparative example and outside the scope of the invention

Resin from Examples 1–3 was further processed to test the Notched Izod strength and fire resistance. Resin from Example 1 was molded into a 125 mm Notched Izod (NI) bar (1A). Resin from Example 1 (1B) as well as from multiple batches of Examples 2 and 3 was intimately mixed with 0.08 part per hundred parts resin of Rimar salt (potassium-perfluorobutane-sulphonate, a fire retardant) and then molded into 125 mm Notched Izod bars. The bars were then tested for strength by ASTM D256-93a and fire resistance as described above. Results are shown in Table 3. The Notched Izod results resistance testing results are shown in Table 3.

TABLE 3

| No. | Notched Izod (ft lb/in) | Fire Resistance |
|---|---|---|
| 1A | 1.9 | 5VB |
| 1B | 1.7 | 5VB |
| 2 | 1.4 | 5VB |
| 3 | 1.2 | 5VB |

Comparison of 1A and 1B shows that the addition of Rimar salt is unnecessary to achieve fire resistance and the presence of Rimar salt decreases the Notched Izod strength. Additionally, examples with less than 4.6 wt % polysiloxane resulted in visually transparent materials when molded into Notched Izod bars. Examples with 4.6 wt % or greater of polysiloxane resulted in opaque materials when molded into Notched Izod bars.

As can be seen by the foregoing examples the block copolymer shows strength, and a high glass transition temperature as well as excellent fire resistance without the addition of a flame resistance additive. Additionally, the block copolymer has a Cl– concentration of less than about 50 ppm, preferably less than about 10 ppm. It also has the added benefit of being transparent when the amount of polysiloxane is less than 4.6 wt % based on the total composition.

While preferred embodiments have been shown and described, various modifications and substitutions may be

What is claimed is:

1. A block copolymer comprising structural units of the formula (I):

$$-R^1-O-\underset{\underset{O}{\|}}{C}-O-,\quad\text{(I)}$$

wherein $R^1$ comprises polysulfone groups and structural units of the formula (II):

$$-R^2-O-\underset{\underset{O}{\|}}{C}-O-,\quad\text{(II)}$$

and
wherein $R^2$ comprises polysiloxane groups.

2. The block copolymer of claim 1 further comprising structural units of the formula (III):

$$-R^3-O-\underset{\underset{O}{\|}}{C}-O-,\quad\text{(III)}$$

wherein $R^3$ comprises aromatic and/or aliphatic groups.

3. The block copolymer of claim 2 wherein the aromatic and/or aliphatic structural units comprise about 0.1 weight percent to about 98 weight percent of the block copolymer.

4. The block copolymer of claim 2 wherein the aromatic groups have the general formula:

$$-A^1-Y^1-A^2-$$

wherein each of $A^1$ and $A^2$ is a monocyclic aryl group and $Y^1$ is a bridging group having one or two atoms which separate $A^1$ from $A^2$.

5. The block copolymer of claim 1 wherein the polysulfone group comprises repeating units of the formula:

(IV) [structure shown]

wherein n is in the range from 1 to about 10.

6. The block copolymer of claim 1 wherein the polysulfone group has the formula:

[structure shown]

wherein n is approximately 5.

7. The block copolymer of claim 1 wherein the polysiloxane group comprises repeating units of the general formula:

$$-\underset{\underset{R^5}{|}}{\overset{\overset{R^4}{|}}{Si}}-O-,\quad\text{(VI)}$$

wherein $R^4$ and $R^5$ are selected independently from the group consisting of saturated and unsaturated hydrocarbons having 1 to about 15 carbons.

8. The block copolymer of claim 7 wherein $R^4$ and $R^5$ are selected independently from the group consisting of methyl and phenyl.

9. The block copolymer of claim 7 wherein the number of repeating units is from 1 to 120.

10. The block copolymer of claim 7 wherein the polysiloxane group has the formula:

[structure shown with $R^9$, $R^6$, $R^{10}$, $R^8$, $R^7$, $R^{11}$, MeO, OMe]

wherein m=0–47 and $R^{6-11}$ are selected independently from the group consisting of saturated and unsaturated hydrocarbons having 1 to about 15 carbons.

11. The block copolymer of claim 10 wherein $R^{6-11}$ are selected independently from the group consisting of methyl and phenyl.

12. The block copolymer of claim 1 wherein the polysulfone group comprises about 80 weight percent to about 99.9 weight percent of the block copolymer and the polysiloxane group comprises about 0.1 weight percent to about 20 weight percent of the block copolymer.

13. The block copolymer of claim 10 wherein the polysiloxane group comprises about 0.1 weight percent to about 3.5 weight percent of the block copolymer.

14. A block copolymer produced by reacting a mixture comprising a carbonate precursor, a dihydroxy polysulfone oligomer, and a dihydroxy polysiloxane oligomer and an endcapping agent.

15. The block copolymer of claim 14 wherein the mixture further comprises dihydroxy aromatic compounds and/or dihydroxy aliphatic compounds.

16. The block copolymer of claim 15 wherein the dihydroxy aromatic compound has the formula:

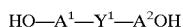

wherein each of $A^1$ and $A^2$ is a monocyclic aryl group and $Y^1$ is a bridging group having one or two atoms which separate $A_1$ from $A^2$.

17. The block copolymer of claim 15 wherein the dihydroxy aromatic compound is a bisphenol.

18. The block copolymer of claim 14 wherein the carbonate precursor is phosgene.

19. The block copolymer of claim 14 wherein the dihydroxy polysulfone oligomer is a dihydroxy aromatic polysulfone oligomer.

20. The block copolymer of claim 14 wherein the dihydroxy polysulfone oligomer has a molecular weight of about 500 to about 10,000.

21. The block copolymer of claim 19 wherein the dihydroxy polysulfone oligomer has a molecular weight of about 2,000 to about 3,500.

22. The block copolymer of claim 14 wherein the dihydroxy polysulfone oligomer comprises repeating units characterized by the general formula:

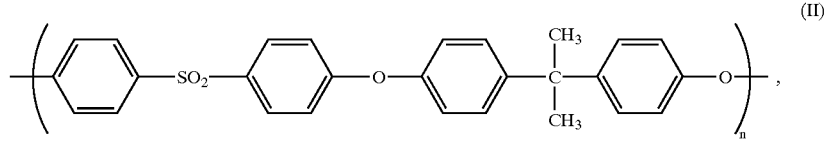

where values for n are in the range from 1 to about 10.

23. The block copolymer of claim 14 wherein the dihydroxy polysulfone oligomer has the formula:

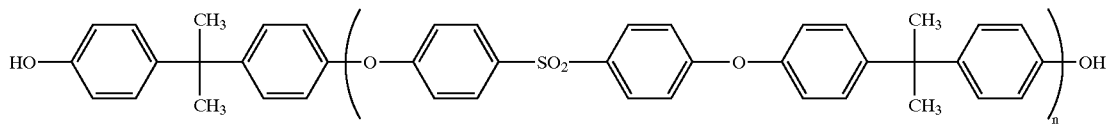

where n is equal to approximately 5.

24. The block copolymer of claim 14 wherein the dihydroxy polysiloxane oligomer comprises repeating units of the general formula:

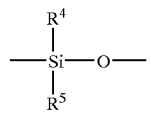

wherein $R^4$ and $R^5$ are selected independently from the group consisting of saturated and unsaturated hydrocarbons having 1 to about 15 carbons.

25. The block copolymer of claim 24 wherein $R^4$ and $R^5$ are selected independently from the group consisting of methyl and phenyl.

26. The block copolymer of claim 24 wherein the dihydroxy polysiloxane oligomer is terminated by a hydroxy aromatic radical.

27. The block copolymer of claim 26 wherein the dihydroxy polysiloxane oligomer is terminated by eugenol or phenol.

28. The block copolymer of claim 14 wherein the dihydroxy polysiloxane oligomer has the formula:

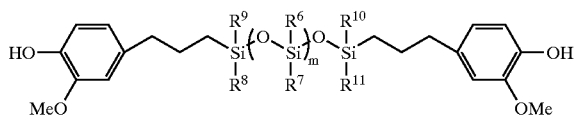

with m=0–47 and $R^{6-11}$ selected independently from the group consisting of saturated and unsaturated hydrocarbons having 1 to about 15 carbons.

29. The block copolymer of claim 28 wherein $R^{6-11}$ are selected independently from the group consisting of methyl and phenyl.

30. The block copolymer of claim 14 wherein the endcapping agent is an aromatic compound with a single hydroxyl group.

31. The block copolymer of claim 1 wherein the Cl⁻ content is less than about 50 parts per million (ppm).

32. The block copolymer of claim 1 wherein the Cl⁻ content is less than about 10 ppm.

* * * * *